Figure 1:
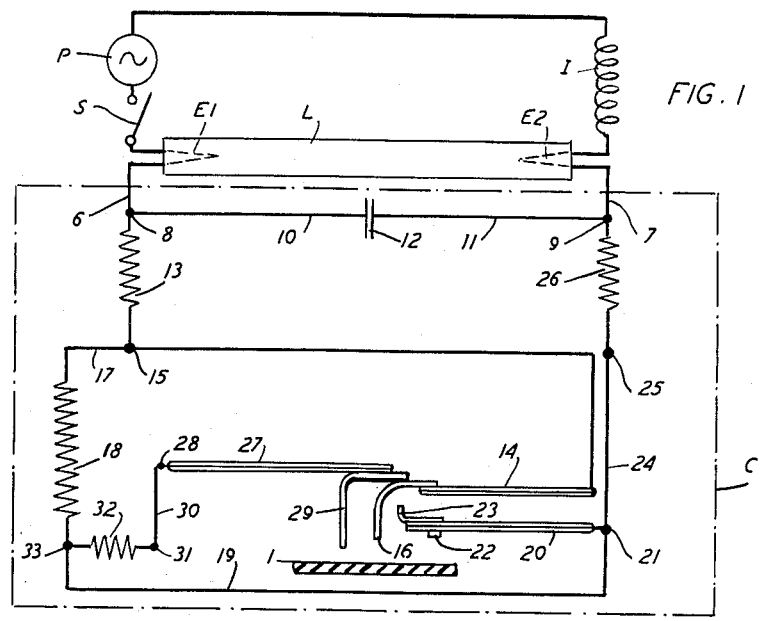

May 29, 1956 W. B. MARTIN ET AL 2,748,315
CURRENT CONTROL CIRCUIT
Filed July 14, 1950

INVENTORS
Harry Trickett
Wade B. Martin

United States Patent Office 2,748,315
Patented May 29, 1956

2,748,315

CURRENT CONTROL CIRCUIT

Wade B. Martin, Ramsey, N. J., and Harry Talberth, Brooklyn, N. Y.

Application July 14, 1950, Serial No. 173,716

6 Claims. (Cl. 315—100)

This invention relates to an electric current control circuit and, more particularly, to a circuit for controlling the application of electric current to the electrodes of a fluorescent lamp.

A conventional fluorescent lamp comprises a suitable mixture of inert gases contained within an elongated tubular envelope having its interior surface coated with a fluorescent substance. The lamp is also provided with thermionic electrodes of filamentary form which are mounted within the tubular envelope near opposite ends thereof. In lighting the lamp, it is first necessary to ionize the gaseous atmosphere within the envelope by heating the filamentary electrodes to an electron emitting temperature because at ordinary room temperatures the gas will not pass sufficient current for lighting purposes. This is accomplished by employing a current control circuit which permits an initial flow of a relatively high current through the electrodes in series to preheat them to the point of electron emission.

When the temperature of the electrodes reaches this point, the current control circuit abruptly interrupts the flow of current thereby causing a relatively high firing potential to be momentarily applied to the electrodes. This ionizes the gaseous atmosphere within the envelope which then serves as a conductive medium for sustaining a current flow between the electrodes at line potential. This line current flow through the gaseous atmosphere between the electrodes generates high intensity radiations within the invisible portion of the spectrum. As is well known in the art, these radiations excite the fluorescent coating on the interior of the lamp and cause it to fluoresce thereby producing visible light.

In designing a current control starting circuit for controlling the application of the preheating current and the firing potential, it is necessary that the circuit be designed to allow ample time for preheating the electrodes before causing the firing potential to be applied as otherwise the electrodes would be damaged, the ends of the lamp would be darkened, and considerable flickering and sputtering of the lamp would occur. On the other hand, it is also desirable, for obvious reasons, that a starting circuit should be designed to consume no more time in the preheating period than is necessary to raise the temperature of the electrodes to an adequate emissive temperature. In addition, the current control circuit should be so designed as to perform its functions accurately over a wide range of ambient temperatures.

Accordingly, it is an object of this invention to decrease the sensitivity of a current control circuit to variations in ambient temperature and external voltage conditions.

It is also an object of this invention to improve the stability of operation of a current control circuit for effecting the preheating of the filamentary electrodes of a fluorescent lamp and for causing a firing potential to be applied to them.

Another object of the invention is to increase the positive action of a current control circuit for disconnecting a source of electric current from the filamentary electrodes of a fluorescent lamp.

An additional object is to provide a current control circuit with close operating tolerances and wide adjusting tolerances.

These and other objects of the invention are accomplished by means of an improved current control circuit having a plurality of bimetallic switches which are operated by heat transmitted thereto both indirectly by radiation from heating elements and directly by conduction over leads of various lengths. This double supply of heat effects rapid operation of the bimetallic switches. In addition, the time delay inherent in the transmission of heat by conduction over a long lead is utilized to control the timing of certain recycling operations of at least one of the bimetallic switches as is described more fully hereinafter.

Figure 2:
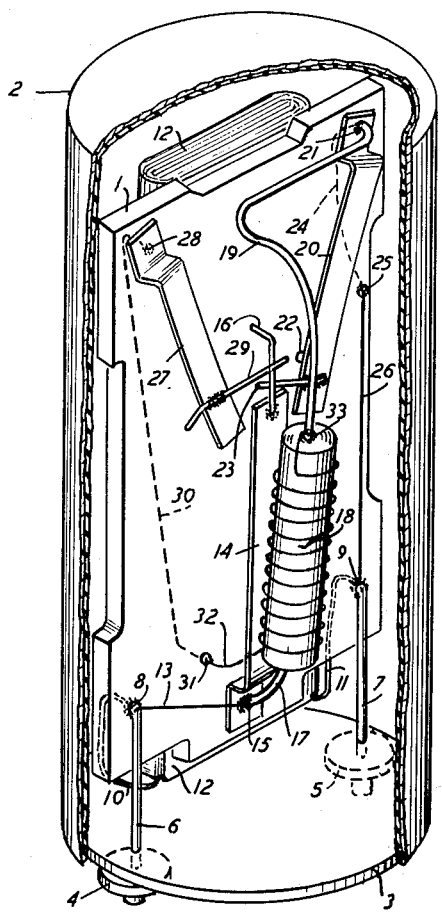

These and other features of the invention are more fully discussed in connection with the following detailed description of the drawing in which:

Fig. 1 is a schematic circuit diagram of the improved current control circuit, and Fig. 2 is a front perspective view of the improved current control circuit with its housing structure broken away to show the manner in which the components of the improved current control starting circuit are assembled and located with respect to each other.

In Fig. 1, a fluorescent lamp L containing a suitable mixture of inert gases is provided at each end with filamentary electrodes E1 and E2. One electrode E1 is connectable through a manually operable switch S to one side of a power supply source P of the customary domestic potential, such as 115 volt 60 cycle current. The other electrode E2 is connected to one end of a suitable ballast impedance I, such as a choke coil, the other end of which is connected to the other side of the power supply source P. A current control starting circuit C is connected between the electrodes E1 and E2 for controlling the application thereto of both the preheating current and the firing potential.

The current control starting circuit C will now be described in detail with reference to both Figs. 1 and 2, similar parts in each figure being similarly numbered. It should be noted that Fig. 2 shows an actual physical embodiment of the invention and that Fig. 1 is a simplified and liberalized circuit representation of the structure shown in Fig. 2. In order to simplify the showing in Fig. 1, various liberties have been taken in depicting the sizes and positions of certain of the elements. Consequently, Fig. 1 is to be taken as a guide in tracing the various electric paths, whereas Fig. 2 is to be consulted for an understanding of the actual sizes and positions of the elements.

The improved current control starting circuit C is mounted on a card 1 of insulating material and is enclosed within a cylindrical casing 2 of any suitable material. The casing 2 together with a base member 3 constitute a housing structure for completely enclosing the starting circuit C. The exterior surface of the base 3 is provided with terminals 4 and 5 for facilitating the electric connection of the current control starting circuit C to the electrodes E1 and E2 in the lighting circuit of the fluorescent lamp L. Two electrically conductive terminal leads 6 and 7 extend from the terminals 4 and 5, respectively, to two eyelets 8 and 9 in the mounting card 1 and are soldered thereto. On the reverse side of the card 1, two electric leads 10 and 11, which are soldered to the eyelets 8 and 9, respectively, extend downward and support a condenser 12 which is electrically connected thereto.

From the eyelet 8, a resistance wire heating element 13 extends to a flexible bimetallic switch 14 composed of any two suitable electrically conductive metals having dissimilar thermal expansion coefficients. The bimetallic switch 14 is securely fastened to the card 1 in any appropriate manner, such as by an eyelet type of rivet 15 filled with solder, and is provided with a contact rod 16 which is composed of electrically conductive material. The contact rod 16 has one end affixed to the free end of the switch 14 by any convenient means, such as by welding, and has its other end bent at an angle for movement against the stop constituted by the mounting card 1.

From the eyelet 15, a lead 17 of electrically conductive material, such as copper, extends outwardly for supporting a large resistor 18 which has one end electrically connected thereto. The other end of the resistor 18 is connected electrically to a long lead 19 composed of electrically conductive material, such as copper.

A second flexible bimetallic switch 20 composed of any two suitable metals that are electrically conductive and that have dissimilar thermal expansion coefficients is affixed to the mounting card 1 in any suitable manner, such as by an eyelet 21 filled with solder. As is shown in Fig. 2, the switch 20 is secured to that end of the mounting card 1 which is opposite the end to which the switch 14 is attached, and is disposed at an angle with respect to the switch 14. An end of the long lead 19 is connected electrically to the switch 20 by means of the solder filled eyelet 21. The bimetallic switch 20 is provided with a short stop rod 22 secured thereto by any appropriate means, such as by welding, for movement against the mounting card 1. The switch 20 is further provided with a contact rod 23 composed of electrically conductive material and which as one end affixed to the free end of the switch 20 by any convenient means, such as by welding. The other end of the contact rod 23 extends underneath the contact rod 16 and is normally separated therefrom by a short space, as is indicated in Fig. 1. It can be seen in Fig. 2 that the contact rods 16 and 23 are disposed at about ninety degrees with respect to each other.

Another lead 24 of electrically conductive material, such as copper, extends along the reverse side of the mounting card 1 from the solder filled eyelet 21 to another eyelet 25 which is also filled with solder. A second resistance wire heating element 26 extends from the eyelet 25 down the front of the card 1 to the solder filled eyelet 9. Thus, the bimetallic switch 20 is connected electrically to the terminal 5 by means of the lead 24, the resistance wire 26, and the lead 7.

A third flexible bimetallic switch 27, like the switches 14 and 20, is composed of any two suitable electrically conductive metals having dissimilar thermal expansion coefficients and is affixed to the mounting card 1 by any convenient means, such as by soldering it to an eyelet type of rivet 28. As is shown in Fig. 2, the switch 27 is secured to the card 1 near the upper left corner thereof and is disposed at an angle with respect to both the switch 14 and the switch 20. Thus, all three of the bimetallic switches 14, 20, and 27 are angularly disposed with respect to each other thereby facilitating control and adjustment of their respective independent heating as is described more fully hereinafter.

The bimetallic switch 27 is provided with a combined stop and contact rod 29 secured thereto in any suitable manner, such as by welding. One end of the rod 29 extends over the rod 16 at an angle of about ninety degrees, as is shown in Fig. 2. The rod 29 is normally in contact with the rod 16, as is indicated in Fig. 1, with the result that the bimetallic members 14 and 27 are normally in electrically conductive engagement. The other end of the rod 29 is bent downward at an angle for movement against the stop constituted by the mounting card 1.

A lead 30 of electrically conductive material, such as copper, extends along the reverse side of the mounting card 1 from the eyelet 28 to another eyelet 31 which is also filled with solder. A third resistance wire heating element 32 extends from the front side of the eyelet 31 to the large resistor 18 and is helically wound around the resistor 18 in the manner shown in Fig. 2 for efficiently radiating heat thereto. An end of the heating element 32 is affixed in any desired manner, such as by soldering, to the lead 19 at or near the point 33 where the lead 19 is connected to the large resistor 18.

In operation, the manual switch S is closed to apply line current from one side of the source of power P to a circuit for operating the fluorescent lamp L. This operating circuit extends from the electrode E1 along the lead 6 and the resistance wire heating element 13 to the eyelet 15 where the circuit divides into two parallel paths. One of these parallel paths extends from the eyelet 15 along the lead 17 and through the large resistor 18 to the junction point 33. The other parallel path extends from the eyelet 15, over the bimetallic switch 14, along the contact rod 16 to contact rod 29, over bimetallic switch 27, lead 30, and then along the resistance wire heating element 32 to the junction point 33. Since the resistivity of the resistance wire heating element 32 is much less than that of the large resistor 18, the path through the resistor 18 is at this time shunted by the path through the bimetallic switches 14 and 27 and the heating element 32. From junction point 33, the operating circuit continues along the long lead 19 to the eyelet 21, along lead 24, through the solder filled eyelet 25, along resistance wire heating element 26, lead 7, electrode E2, and then through the inductive ballast I to the other side of the power supply P.

The resulting flow of line current through the electrodes E1 and E2 causes them to become increasingly warm and their temperature is soon raised to a point at which they will emit electrons thereby partially ionizing the gaseous atmosphere contained within the envelope of the lamp L.

At the same time, the flow of line current through the several leads, significantly lead 19, and the resistance wire heating elements 13, 26, and 32 causes them all to become hot. The heat generated by the heating element 32 is effectively radiated to the large resistor 18 due to the heating element 32 being wound helically around the resistor 18. The heat produced by the heating element 32 is also radiated to the bimetallic switch 14 which is in close proximity thereto as can be seen in Fig. 2. The heat generated by the flow of line current through the heating element 13 is transmitted by conduction to the solder filled eyelet 15, where it is stored to a certain extent, and thence, also by conduction, to the bimetallic switch 14. The heating element 13 thus functions as a booster heater in respect to the switch 14.

The heat transmitted by radiation from the heating element 32 to the bimetallic switch 14 together with the heat transmitted direcly by conduction from the heating element 13 to the switch 14 will soon be effective to cause the bimetallic switch 14 to bend toward the mounting card 1 carrying with it the contact rod 16. The bimetallic switch 14 and the resistance wire heating elements 13 and 32 are so proportioned that the contact rod 16 will be moved out of engagement with the contact rod 29 at substantially the same time that the electrodes E1 and E2 become sufficiently heated for a discharge to be initiated across the lamp L. The movement of the bimetallic switch 14 is accelerated by the heat conducted to it by the booster heating element 13 with the result that the break between the contact rods 16 and 29 will be sharp and fast. Although the bimetallic switch 27 receives some heat during this period, the amount of this heat is not sufficient to effect any useful movement of the switch 27 at this time.

When the bimetallic member 14 thus moves out of electrically conductive engagement with the bimetallic member 27, the normally closed shunt circuit containing the bimetallic switches 14 and 27 and the heating element 32 is opened thereby opening the shunt across the large resistor 18 and, in effect, switching it into the operating circuit. A small condenser 12 is connected between the junction points 8 and 9 by leads 10 and 11 to minimize sparking when the shunt across the resistor 18 is thus opened. The resistor 18 has such a high resistivity that the sudden switching of it into the operating circuit has almost the same effect as though the operating circuit through the electrodes E1 and E2 and the inductive ballast I was suddenly interrupted. This causes the inductive ballast I to produce a high voltage surge or "kick" across the preheated electrodes E1 and E2 thereby completing the ionization of the gaseous atmosphere contained within the envelope of the lamp L. In turn, the ionization of the gas permits the striking of a low voltage arc between the electrodes E1 and E2. When once started in this manner, the arc discharge will be sustained by the line voltage due to the fact that the electrodes E1 and E2 are maintained at a discharge sustaining, or electron emitting, temperature by the discharge current through the lamp L.

It should be noted that during the period while the bimetallic switch 14 is being heated, heat is also produced by the flow of current through the resistance wire heating element 26 and is transmitted to the bimetallic switch 20 both by radiation thereto and by conduction along the lead 24. Some of this heat is stored in the solder filled eyelets 21 and 25. At the same time, the flow of line current through the lead 19 generates heat which is stored in the solder filled eyelet 21 and which is also transmitted by conduction to the bimetallic switch 20 and to the large resistor 18 for additional preheating thereof. The heat thus supplied by radiation and conduction to the bimetallic switch 20 causes is to bend toward the mounting card 1 carrying with it the contact rod 23 at substantially the same time as the bending of the bimetallic switch 14. Thus, when the contact rod 16 moves away from the contact rod 29, it will not engage the contact rod 23 because the same relative spacing, or separation, between the contact rods 16 and 23 that is shown in Fig. 1 will be maintained by the substantially similar and simultaneous bending of the bimetallic switches 14 and 20.

The opening of the parallel path through the heating element 32 causes it to stop producing heat. The loss of the heat that was formerly supplied by radiation from the heating element 32 to the bimetallic switch 14 is compensated by heat which is now radiated thereto by the resistor 18. This is due to the fact that, during the time that the lamp L is in operation, a sufficient amount of current will flow through the preheated resistor 18 to maintain it warm. This same current also flows through the heating elements 13 and 26 to maintain them warm. Although the heat inertia of the resistor 18 is great because of its relatively large mass, this inertia is overcome during the initial attempt to fire the lamp L because of the preheating of the resistor 18 by the heating element 32 in the manner described above. The heat produced by the resistor 18 is transmitted by conduction over leads 17 and 19 to the bimetallic switch elements 14 and 20, respectively. Since the transmission time of the conduction of heat over a wire is a function of the length of the wire and since the lead 17 is considerably shorter than the lead 19, the heat conducted from the resistor 18 will reach the bimetallic switch 14 much sooner than it will reach the bimetallic switch 20. When the heat in the resistor 18 is stabilized, the two switches 14 and 20 will be heated to approximately the same temperature.

This heating of the bimetallic switches 14 and 20 causes them to bend further toward the mounting card 1 while still maintaining the same relative spacing or separation between their associated contact rods 16 and 23, respectively. Although some of this heat is radiated to the bimetallic switch 27, it is not sufficient to effect any useful movement of the switch 27 at this time. Thus, during the normal operation of the lamp L, the temperature of the units within the casing 2 will be fairly constant and the three bimetallic switches 14, 20, and 27 will remain in the positions just described which may be referred to as their operated, or floating, positions.

If the lamp L should fail to fire on the initial attempt, the full line voltage will be applied over the leads 17 and 19 to the resistor 18 and will quickly increase its temperature. A portion of the increased heat now produced by the resistor 18 will be transmitted by radiation to the switch 14 due to their proximity and other portions of this heat will be transmitted by conduction over two paths, one over lead 17 to switch 14 and the other over lead 19 to switch 20. Since the lead 17 is relatively short, it will rapidly conduct this heat to the bimetallic switch 14 thereby causing it to bend further toward the mounting card 1. The lead 19 is purposely made relatively long in order to provide a time delay in the conduction of heat to the switch 20. In fact, the length of the lead 19 is so proportioned that the increased heat will not be fully conducted along lead 19 to switch 20 until switch 14 has moved its contact rod 16 down into engagement with the contact rod 23 on switch 20. In other words, the relative time of motion of the switches 14 and 20 during this recycling period is determined by the relative lengths of the heat conductive leads 17 and 19 and can be adjusted by varying the lengths of these leads 17 and 19 to thereby provide close operating tolerances. The spacing between the contact rods 16 and 23 is characterized by wide adjusting tolerances since it need not be critically close due to the fact that the motion of switch 14 is rapid because it receives heat both by conduction and by radiation as was described above.

When the bimetallic member 14 thus moves into electrically conductive engagement with the bimetallic member 20, a shunt path is thereby closed for shunting the resistor 18. This second shunt circuit extends from the junction point 15, over the bimetallic switch 14, contact rod 16, contact rod 23, and then over the bimetallic switch 20 to the junction point 21. The line current now flows over this shunt path instead of through the resistor 18 thereby permitting the resistor 18 to become cooler. This causes a reduction in the heat now supplied to the switch 14 and permits it to become cooler so that it ceases to bend toward the mounting card 1 and, as it cools, begins to bend away from the card 1. At this time, the switch 20, which is receiving heat from the heating element 26 both by radiation and by conduction along the lead 24, receives the full amount of the delayed conduction heat over lead 19. This combined heat causes the bimetallic switch 20 to bend nearer to the mounting card 1 thereby moving the contact rod 23 out of engagement with the contact rod 16.

When the contact rod 23 thus moves away from the contact rod 16, this action opens the shunt across the resistor 18 and places it again in series with the electrodes E1 and E2. As was stated above, this virtually interrupts the series circuit through the electrodes E1 and E2 and the inductive ballast I due to the high resistivity of the resistor 18. The high voltage surge now produced by the ballast coil I due to this interruption is applied to the preheated electrodes E1 and E2 in another attempt to fire the lamp L. If the lamp L fires in response to this high voltage surge, the various units assume their floating, or operating, positions described above.

If the lamp L fails to fire on this second attempt for various reasons, such as deactivation of its filaments or failure to maintain the arc discharge, the current control circuit will automatically make another attempt to fire the lamp L. This third attempt will be performed in the same manner as the second attempt described above.

Should the lamp L still fail to fire, the recycling operation described above will be repeated until the lamp L fires or until the temperature of the units increases to a point where the control circuit is placed in a cut-out condition. This rise in temperature is due to both an increase in the ambient temperature within the casing 2 and an increase in the heat conducted over the lead 17 and, more particularly, over the long lead 19. There is also an increase in the amount of heat stored in the various solder filled eyelets, such as eyelets 15, 21, and 25. This increased heat finally causes the bimetallic switch 14 to bend still further toward the mounting card 1 until the bent end of the contact rod 16 presses against the surface of the card 1. The increased heat also causes the bimetallic switch 20 to bend further toward the mounting card 1 until its stop member 22 presses against the card 1. Similarly, this heat causes the bimetallic switch 27 to bend toward the mounting card 1 until the bent end of its contact rod 29 touches the card 1. This position of the switches 14, 20, and 27 is called their cut-out position.

With the bimetallic switches 14, 20, and 27 thus in their cut-out position, none of the contact rods 16, 23, and 29 will be in engagement with each other. This is due to the fact that the stop members of the switches 14, 20, and 27 are so proportioned that, when all three are touching the card 1, all three contact rods 16, 23, and 29 will be separated from each other. This can be understood by referring to Fig. 1 wherein it can be seen that the stop member 22 is very short, the bent portion of rod 16 is longer, and the bent portion of rod 29 is longer than the bent portion of rod 16. With the contact rods 16, 23, and 29 thus separated from each other, all paths through the bimetallic switches 14, 20, and 27 will be open.

The resistor 18 remains connected in the operating circuit during this cut-out period and the heat now produced by the heating elements 13 and 26, resistor 18, and the leads 17, 19, and 24 serves to maintain the bimetallic switches 14, 20, and 27 in their cut-out position so that no additional recycling attempts to fire the lamp L will be made. The circuit will remain in this condition until the manually operable control switch S has been opened to discontinue the flow of current through the resistor 18 for a sufficient length of time to permit the bimetallic switches 14, 20, and 27 to become cooled and thereby move out of their cut-out position.

It should be noted that the bimetallic switches 14, 20, and 27 are so proportioned that changes in the ambient temperature within the casing 2 affect each of them equally in respect to both direction and extent of movement thus maintaining the same relative spacing between the contact rods 16, 23, and 29 that was described above in regard to their floating, or operating, position.

It is to be understood that the specific construction described above and shown in the drawing has been set forth for the purpose of explaining the principles and features of operation of the invention, and that various modifications may be made without departing from the scope of the invention which is to be limited only by the claims appended hereto.

What is claimed is:

1. A current control circuit comprising in combination first and second electric terminal leads, a resistor, electrically conductive coupling means for coupling said resistor across and between said leads, a shunt circuit connected across said resistor, a bimetallic switch connected in series in said shunt circuit, said shunt circuit being normally closed only by virtue of said bimetallic switch being normally cold and in a closed position, and heating means for heating said bimetallic switch for deflecting it to an open position for opening said shunt circuit, said heating means including an electric heating element connected in series in said shunt circuit and disposed in heat radiating relation to said bimetallic switch, said electrically conductive coupling means including accelerating means for accelerating said deflection of said bimetallic switch, said accelerating means comprising a resistance wire heating element disposed in heat conducting relation to said bimetallic switch and electrically coupled across and between said terminal leads in series with said resistor.

2. In combination, a current control circuit having first and second electric terminal leads, a source of electric current, first electrically conductive coupling means for coupling said source to said leads, a resistor, second electrically conductive coupling means for coupling said resistor across and between said leads, a shunt circuit connected across said resistor for substantially preventing the flow of electric current from said source through said resistor when said shunt circuit is closed, a bimetallic switch connected in series in said shunt circuit, said shunt circuit being normally closed only by virtue of said bimetallic switch being normally cold and in a closed position, control means for effecting a flow of electric current from said source through said resistor, said resistor having the property of generating heat when electric current from said source flows through it, said control means including opening means for opening said shunt circuit, said opening means comprising heating means for effecting a deflection of said bimetallic switch to an open position, said heating means including an electric heating element connected in series in said shunt circuit and disposed in heat radiating relation to said bimetallic switch, said second electrically conductive coupling means including accelerating means for accelerating said deflection of said bimetallic switch, said accelerating means comprising a resistance wire heating element disposed in heat conducting relation to said bimetallic switch and electrically coupled across and between said terminal leads in series with said resistor and means for maintaining said bimetallic switch in said open position, said last-mentioned means comprising supply means for supplying heat from said resistor to said bimetallic switch, said supply means including a portion of said second electrically conductive coupling means, said portion including a heat conductive lead electrically coupled across and between said terminal leads in series with and between said resistor and said resistance wire heating element, said heat conductive lead being coupled in heat conducting relation to said bimetallic switch.

3. In combination, a current control circuit having first and second electric terminal leads, a source of electric current, first electrically conductive coupling means for coupling said source to said leads, a resistor, second electrically conductive means for coupling said resistor across and between said leads, a first shunt circuit connected across said resistor, a bimetallic switch connected in series in said first shunt circuit, said first shunt circuit being normally closed only by virtue of said bimetallic switch being normally cold and in a closed position, control means for effecting a flow of electric current from said source through said resistor, said resistor having the property of generating heat when electric current from said source flows through it, said resistor being disposed in heat radiating relation to said bimetallic switch, said control means including opening means for opening said first shunt circuit, said opening means comprising first heating means for effecting a deflection of said bimetallic switch to an open position, a second shunt circuit connected across said resistor, an electrically conductive contact member, both said contact member and said bimetallic switch being connected in series in said second shunt circuit and disposed in engageable relation with each other, said second shunt circuit being normally open by virtue of said bimetallic switch and said contact member being normally in mutual disengagement, closing means for closing said second shunt circuit, said closing means including second heating means for effecting the movement of said bimetallic switch into engagement with said contact member, said second heating means including a heat conductive lead disposed in heat conducting relation to said bimetallic switch and electrically coupled across and between said terminal leads in series with said resistor.

4. In combination, a current control circuit having first and second electric terminal leads, a source of electric current, first electrically conductive coupling means for coupling said source to said leads, a resistor, second electrically conductive means for coupling said resistor across and between said leads, a first shunt circuit connected across said resistor, a first bimetallic switch connected in series in said first shunt circuit, said first shunt circuit being normally closed only by virtue of said first bimetallic switch being normally cold and in a closed position, first control means for effecting a flow of electric current from said source through said resistor, said resistor having the property of generating heat when electric current from said souce flows through it, said resistor being disposed in heat radiating relation to said first bimetallic switch, said first control means including opening means for opening said first shunt circuit, said opening means comprising first heating means for effecting a deflection of said first bimetallic switch to an open position, a second shunt circuit connected across said resistor, a second bimetallic switch, both said first and second bimetallic switches being connected in series in said second shunt circuit and disposed in engageable relation with each other, said second shunt circuit being normally open by virtue of said bimetallic switches being normally in mutual disengagement, second control means for substantially discontinuing the flow of electric current from said source through said resistor, said second control means including closing means for closing said second shunt circuit, said closing means including second heating means for effecting the movement of said first bimetallic switch into engagement with said second bimetallic switch, said second heating means including a first heat conductive lead disposed in heat conducting relation to said first bimetallic switch and electrically coupled across and between said terminal leads in series with said resistor and located between said resistor and said first terminal lead, and third control means for opening said second shunt circuit, said third control means including third heating means for effecting the movement of said second bimetallic switch out of engagement with said first bimetallic switch, said third heating means including a second heat conductive lead substantially longer than said first heat conductive lead for providing a time delay in the conduction of heat thereover, said second heat conductive lead being disposed in heat conducting relation to said second bimetallic switch and electrically coupled across and between said terminal leads in series with said resistor and located between said resistor and said second terminal lead.

5. In combination, a current control circuit having first and second electric terminal leads, a source of electric current, first electrically conductive coupling means for coupling said source to said leads, a resistor, second electrically conductive coupling means for coupling said resistor across and between said leads, a shunt circuit connected across said resistor, first and second bimetallic switches connected in series in said shunt circuit and disposed in engageable relation with each other, said shunt circuit being normally open by virtue of said bimetallic switches being normally in mutual disengagement, first control means for closing said shunt circuit, said first control means including first heating means for effecting the movement of said first bimetallic switch into engagement with said second bimetallic switch, second control means for reopening said shunt circuit, said second control means including second heating means for effecting the movement of said second bimetallic switch out of engagement with said first bimetallic switch, said second heating means including a resistance wire heating element disposed in heat radiating relation to said second bimetallic switch, said second heating means, means also including a heat conductive lead disposed in heat conducting relation to said second bimetallic switch, said resistance wire heating element having one end connected to one of said electric terminal leads and its other end connected to one end of said heat conductive lead, said heat conductive lead and said resistance wire heating element being electrically coupled across and between said terminal leads in series with said resistor.

6. In combination, an electric gaseous discharge device having at least two electrodes, an inductive impedance, a source of electric current, electrically conductive coupling means for electrically coupling said source and said impedance in series with said electrodes, and a current control circuit for controlling the application of current from said source to said impedance for producing high voltage surges across said electrodes, said current control circuit comprising a plurality of heat producing elements, first means for effecting the production of a first high voltage surge across said electrodes, said first means including a contact member and a first bimetallic member normally in engagement with each other, said first bimetallic member being actuated to move out of engagement with said contact member in response to heat radiated thereto, from one of said heat producing elements simultaneously with heat conducted thereto from a second one of said heat producing elements, and second means for effecting the production of a second high voltage surge across said electrodes, said second means including a second bimetallic member disposed in engageable relation with said first bimetallic member but normally out of engagement therewith, a third one of said heat producing elements having a first heat conductive lead for conducting heat to said second bimetallic member, said first lead being substantially long in length for providing a time delay in the conduction of heat thereover to said second bimetallic member, said third heat producing element also having a relatively short heat conductive lead for quickly conducting heat to said first bimetallic member for effecting the engagement of said first bimetallic member with said second bimetallic member before said second bimetallic member is actuated by heat conducted thereto over said first heat conductive lead, said second bimetallic member being actuated by said delayed conducted heat and by heat received from a fourth one of said heat producing elements both by conduction and by radiation therefrom to move out of engagement with said first bimetallic member, said third and fourth heat producing elements together with both of said heat conductive leads all being connected in series with each other across and between said electrodes.

References Cited in the file of this patent
UNITED STATES PATENTS

| | | |
|---|---|---|
| 2,355,476 | Smith | Aug. 8, 1944 |
| 2,398,682 | Whiteside | Apr. 16, 1946 |
| 2,464,704 | Martin | Mar. 15, 1949 |